Sept. 30, 1941.   J. L. DRAKE   2,257,229
FURNACE
Filed Sept. 23, 1937   2 Sheets—Sheet 1

Inventor
JOHN L. DRAKE.

By Frank Fraser
Attorney

Sept. 30, 1941.  J. L. DRAKE  2,257,229
FURNACE
Filed Sept. 23, 1937  2 Sheets-Sheet 2

Inventor
JOHN L. DRAKE.
By
Frank Fraser
Attorney

Patented Sept. 30, 1941

2,257,229

UNITED STATES PATENT OFFICE 2,257,229

FURNACE

John L. Drake, Toledo, Ohio, assignor to Libbey-Owens-Ford Glass Company, Toledo, Ohio, a corporation of Ohio Application September 23, 1937, Serial No. 165,269

4 Claims. (Cl. 110—56)

This invention relates to reversible regenerative furnaces.

Although of special utility in the making of glass, the present invention is not restricted to such use but may also be employed in the heating or making of steel or in the performance of other heating operations. Consequently, while the invention will be herein described and illustrated in the drawings as applied particularly to a glass melting furnace, it will be appreciated that this is only illustrative of one way in which it might be used.

In certain types of reversible regenerative glass melting furnaces, it is customary to provide a single checker-chamber extending longitudinally at each side of the furnace and communicating therewith by a series of passages which lead to the firing ports. Arranged within the checker-chamber is a brick checker-work which functions to absorb heat from the products of combustion passing therethrough from the furnace to preheat the incoming air upon reversal of said furnace. Beneath each checker-chamber and in communication therewith is a longitudinally extending tunnel through which the outgoing products of combustion and incoming air are adapted to alternately pass.

The air for combustion purposes is taken directly from the atmosphere and, without being treated in any way, is passed through the checker-chambers to the furnace. During its passage through the checker-chambers, the air is adapted to be heated by contact with the brick checker-work. Due to the variations in atmospheric temperature, however, the temperature of the outside air supplied to the checker-chambers will vary greatly from day to day, resulting in ununiform combustion of the gas and air and rendering it difficult to establish and maintain predetermined firing conditions over any considerable length of time.

It is the primary object of this invention to provide a furnace construction and method of furnace operation whereby the heated air supplied to the furnace will be of a more constant, uniform temperature than heretofore, resulting in improved combustion of the gas and air.

Another object of the invention is the provision of a furnace construction and method of furnace operation wherein the outside air is preheated before being introduced into the checker-chambers so that as it passes through said checker-chambers, it will be heated to a more even, constant temperature.

Another object of the invention is the provision of a furnace construction and method of furnace operation wherein the heat from the products of combustion passing through the checker-chambers is utilized to preheat the incoming air before said air is supplied to said checker-chambers.

Other objects and advantages of the invention will become more apparent during the course of the following description when taken in connection with the accompanying drawings.

In the drawings wherein like numerals are employed to designate like parts throughout the same:

Figure 1:
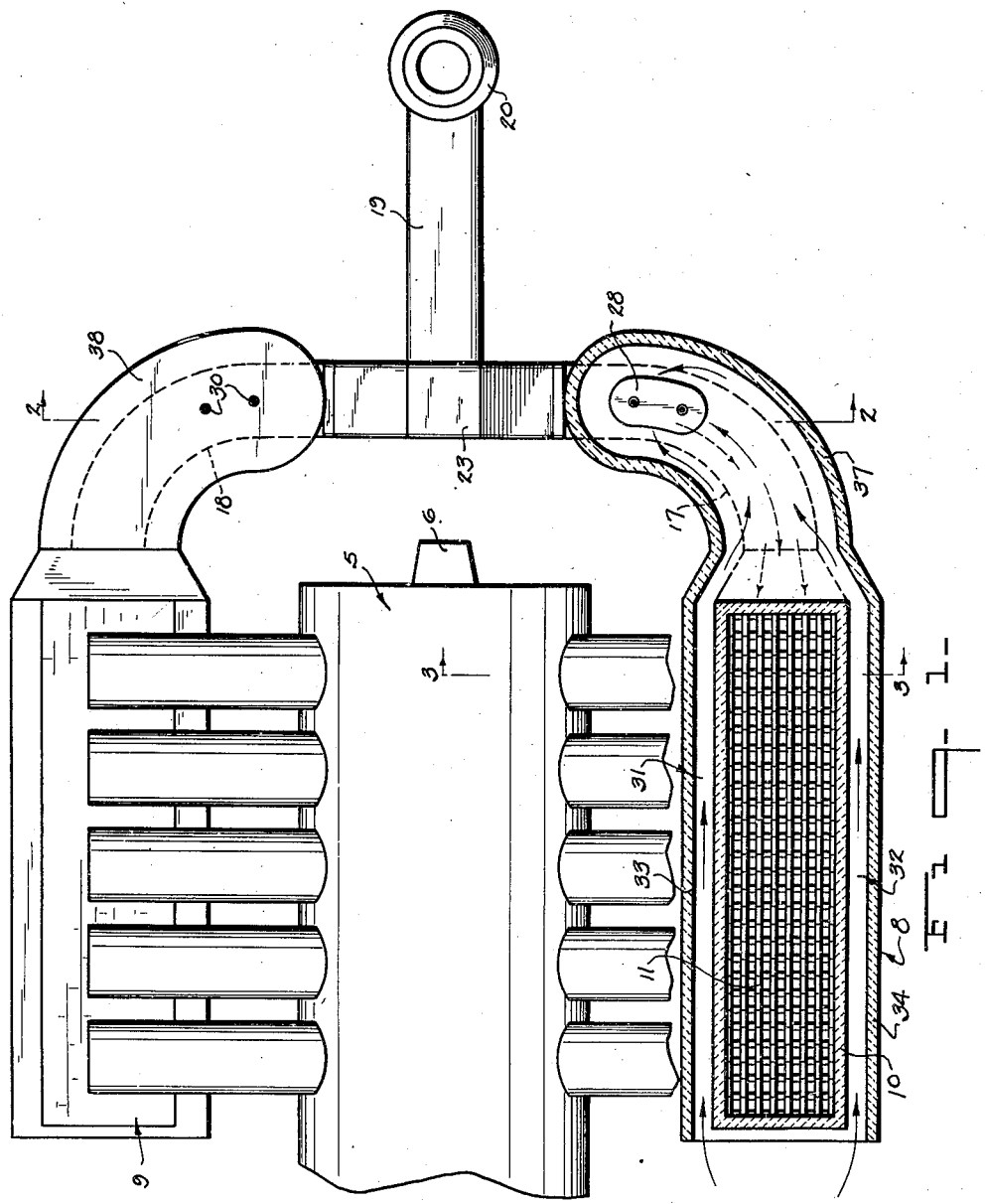
Fig. 1 is a plan view of a reversible regenerative furnace constructed in accordance with the present invention, with the regenerative heating means at one side thereof being shown in section.

With reference now to the drawings, the melting end of a glass tank furnace is shown at 5, with the glass batch being introduced therein at one end through a so-called doghouse 6 and melted to produce a mass of molten glass 7. The molten glass is caused to flow through the refining and cooling portions of the furnace toward the point of emergence where it may be worked into any desired kind of glassware as well known in the art.

Arranged along opposite sides of the melting end of the furnace are the regenerative heating means 8 and 9, each including a longitudinally extending checker-chamber 10 within which is mounted the brick checker-work 11. The checker-chamber 10 is provided with a plurality of uptakes 12 communicating by horizontal passages 13 with the firing ports 14 in the side walls of the furnace. Gas burners 15 project into the passages 13 through the side walls thereof closely adjacent the ports 14 and the gas uniting with the heated air from the checker-chambers forms the fire which melts the glass producing materials.

The brick checker-work 11 is so constructed that the exhaust gases and incoming air can flow in and around the same in a manner well known in the art, the exhaust gases heating the brick checker-work and this heat being subsequently transferred to the incoming air upon reversal of the furnace. The checker-work is spaced from the bottom of the respective checker-chamber to form a longitudinally extending tunnel 16. These tunnels are closed at one end while connected with the opposite end of the tunnels of the regenerative heating means 8 and 9 are conduits 17 and 18 respectively which communicate at their outer ends with a flue 19 leading to a stack 20. The conduits 17 and 18 are separated from one another at their outer ends by the spaced transverse walls 21 and 22 which constitute extensions of the side walls of flue 19.

Figure 2:
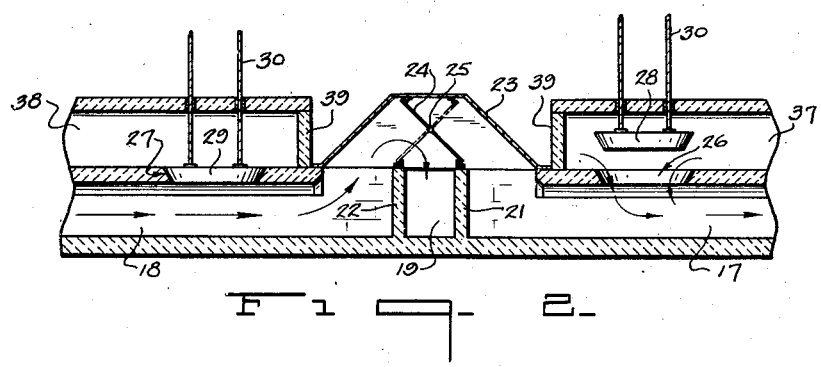
Fig. 2 is a transverse sectional view taken substantially on line 2—2 of Fig. 1.
Figure 3:
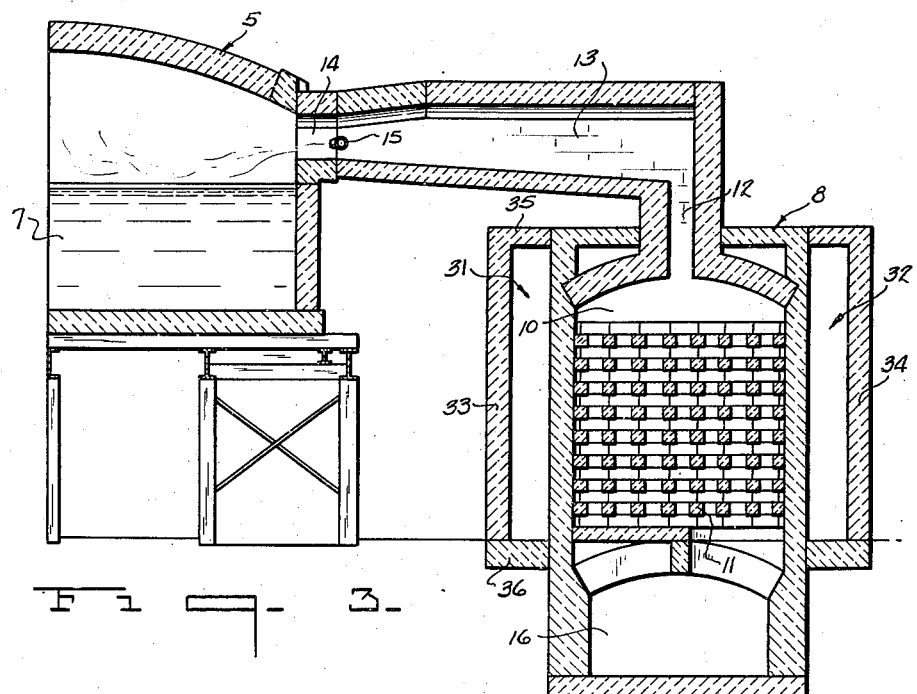
Fig. 3 is a transverse sectional view taken substantially on line 3—3 of Fig. 1.

The top walls of the conduits 17 and 18 terminate inwardly of the transverse walls 21 and 22 as best shown in Fig. 2 and supported upon said conduits and spanning said walls 21 and 22 is a metal hood 23 within which is arranged a butterfly valve 24 pivotally mounted as at 25. The top walls of the conduits 17 and 18 are provided adjacent the metal hood 23 with air intake openings 26 and 27 respectively closed by valves 28 and 29 which may be opened and closed by the raising and lowering means 30.

In the operation of the furnace and assuming the regenerative heating means 8 is in operation so that the flames will enter the furnace from this side, pass across the same and exhaust through the regenerative heating means 9, the valve 28 will be open, the valve 29 closed, and the butterfly valve 24 swung to the position indicated by the full lines in Fig. 2. The incoming air will enter through the intake opening 26 and pass through the conduit 17 to the regenerative heating means 8 and thence to the furnace, exhausting through the regenerative heating means 9 and passing through the conduit 18 to the flue 19 and stack 20. Upon reversal of the furnace so that the regenerative heating means 9 will be in operation and the products of combustion will exhaust through regenerative heating means 8, the valve 28 will be closed, valve 29 opened, and the butterfly valve 24 swung to the position indicated by the broken lines in Fig. 2, whereupon the travel of the incoming air will be reversed so that it will enter the furnace through the conduit 18 and regenerative heating means 9.

As pointed out above, it has heretofore been customary to take the air for combustion purposes from the atmosphere and feed it directly to the regenerative heating means. Also, that due to the variations in atmospheric temperature, the temperature of the air entering the checker-chambers would vary greatly so that while the air would be heated to some extent in passing through said checker-chambers, it would not be of a constant uniform temperature upon reaching the furnace ports.

According to the present invention, this objectionable feature is eliminated by preheating the outside air before it is introduced into the checker-chambers so that the air will always be heated to a uniform maximum temperature before arriving at the furnace ports to be mixed with the gas. To this end, there is provided at opposite sides of each checker-chamber 10, outwardly thereof, the air preheating chambers 31 and 32 for receiving the outside air and conveying it to the intake opening 26 or 27. The air preheating chambers 31 and 32 are formed by the side walls 33 and 34 and top and bottom walls 35 and 36 which cooperate with the side walls of the checker-chamber. The air preheating chambers 31 and 32 are open at one end, as shown in Fig. 1, and communicate at their opposite end with conduits 37 and 38 formed above the conduits 17 and 18 respectively and in communication therewith through the intake openings 26 and 27, each conduit 37 and 38 being closed at its outer end by the wall 39.

With such an arrangement, the outside air is not supplied directly through the intake openings 26 and 27 but instead is caused to pass first through the chambers 31 and 32 wherein it is adapted to be preheated by the heat dissipated through the side walls of the checker-chamber. The preheated air, upon leaving the chambers 31 and 32, passes through the conduit 37 or 38 and thence through the intake opening 26 or 27 into the conduit 17 or 18, depending upon which regenerative heating means is in operation. The preheating of the outside air before it enters the checker-chambers makes it possible to heat the air as it passes through said checker-chambers to a more uniform temperature even though the atmospheric temperature may undergo considerable variation. The supplying of air of a constant, uniform temperature to the furnace ports greatly facilitates and improves combustion, making it easier to establish and maintain predetermined firing conditions in the furnace.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The combination with a furnace including reversible regenerative heating means comprising checker-chambers communicating with opposite sides of the furnace and brick checker-work arranged in said checker-chambers, of a heating chamber arranged alongside of each checker-chamber outwardly thereof for receiving outside air in one end thereof and in which said air is preheated by the heat dissipated through the adjacent side wall of said checker-chamber, means for receiving the preheated air from the opposite end of said heating chamber and delivering it to said checker-chamber, and means associated with said last-named means for shutting off the supply of preheated air from said heating chamber to said checker-chamber and for also preventing the flow of products of combustion from said checker-chamber to the said heating chamber upon reversal of the regenerative heating means.

2. The combination with a furnace including reversible regenerative heating means comprising checker-chambers communicating with, opposite sides of the furnace and brick checker-work arranged in said checker-chambers, of heating chambers arranged along opposite sides of each checker-chamber outwardly thereof for receiving outside air in one end thereof and in which said air is preheated by the heat dissipated through the adjacent side walls of said checker-chamber, means for receiving the preheated air from the opposite ends of said heating chambers and delivering it to said checker-chamber, and means associated with said last-named means for shutting off the supply of preheated air from said heating chambers to said checker-chamber and for also preventing the flow of products of combustion from the said checker-chamber to the said heating chambers upon reversal of the regenerative heating means.

3. The combination with a furnace including reversible regenerative heating means comprising checker-chambers communicating with opposite sides of the furnace, brick checker-work arranged in said checker-chambers, a stack, conduits leading from said checker-chambers to said stack and each conduit having an air intake opening, valves for controlling said openings, and means for placing either one of said conduits in communication with said stack, of heating chambers arranged along the sides of said checker-chambers outwardly thereof for receiving outside air in one end thereof and in which said air is preheated by the heat dissipated through the adjacent side walls of said checker-chambers, and conduits leading from the opposite ends of said heating chambers and adapted to communicate with the conduits leading from said checker-chambers upon opening of said valves to deliver the preheated air to said checker-chambers, said valves serving when closed to shut off the supply of preheated air to said checker-chambers and for also preventing the flow of products of combustion from the said checker-chambers to their respective heating chambers.

4. The combination with a furnace having a horizontally elongated melting end provided with firing ports in opposite side walls thereof, reversible regenerative heating means arranged along opposite sides of said melting end, each including a longitudinally extending checker-chamber having imperforate side walls and a plurality of uptakes communicating with the firing ports at the respective side of the furnace and a brick checker-work in each checker-chamber spaced from the bottom of said checker-chamber to form a longitudinally extending tunnel, a stack, conduits leading from the tunnels of said checker-chambers to said stack and each conduit having an air intake opening, valves for controlling said openings, and means for placing either one of said conduits in communication with said stack, of heating chambers arranged along the sides of said checker-chambers outwardly thereof for receiving outside air in one end thereof and in which said air is preheated by the heat dissipated through the side walls of said checker-chambers, and conduits leading from the opposite ends of said heating chambers and adapted to communicate with the conduits leading from said checker-chamber tunnels upon opening of said valves to deliver the preheated air to said checker-chambers, said valves serving when closed to shut off the supply of preheated air to said checker-chambers and for also preventing the flow of products of combustion from the said checker-chambers to their respective heating chambers.

JOHN L. DRAKE.